United States Patent
Modavis (10) Patent No.: US 7,471,435 B2
(45) Date of Patent: Dec. 30, 2008

(54) APODIZATION TECHNIQUE FOR ENHANCED RESOLUTION OF IMAGES

(76) Inventor: Robert A. Modavis, 14 Taylor St., Painted Post, NY (US) 14870

( * ) Notice: Subject to any disclaimer, the term of this patent is extended or adjusted under 35 U.S.C. 154(b) by 231 days.

(21) Appl. No.: 11/054,722

(22) Filed: Feb. 10, 2005

(65) Prior Publication Data

US 2005/0185242 A1    Aug. 25, 2005

Related U.S. Application Data

(60) Provisional application No. 60/547,386, filed on Feb. 24, 2004.

(51) Int. Cl.
*G02B 26/02* (2006.01)

(52) U.S. Cl. .................. 359/227; 359/387

(58) Field of Classification Search ........... 362/321, 362/351, 360; 359/387, 232
See application file for complete search history.

(56) References Cited

U.S. PATENT DOCUMENTS

| 3,977,772 | A | | 8/1976 | Rimmer et al. |
| 4,030,817 | A | | 6/1977 | Westell |
| 4,407,569 | A | * | 10/1983 | Piller et al. ............ 359/370 |
| 5,249,080 | A | | 9/1993 | Watson et al. |
| 5,621,500 | A | * | 4/1997 | Shiraishi ............ 355/71 |
| 6,130,776 | A | * | 10/2000 | Takaoka ............ 359/370 |
| 6,243,197 | B1 | * | 6/2001 | Schalz ............ 359/388 |

* cited by examiner

*Primary Examiner*—Euncha P Cherry
(74) *Attorney, Agent, or Firm*—Jason R. Womer; Hiscock & Barclay, LLP (57) ABSTRACT

The present invention provides an apodization mask that narrows the central lobe of an optical image of a point in a focusing system and suppresses the amplitudes of the sidelobes of the image that are within a predetermined radius of the central axis of the sidelobes, thereby improving resolution of point objects that are relatively close together and presenting better images of small objects.

8 Claims, 8 Drawing Sheets

APODIZATION TECHNIQUE FOR ENHANCED RESOLUTION OF IMAGES

CROSS-REFERENCE TO RELATED APPLICATIONS

This application claims the benefit of the priority date of U.S. Provisional patent application Ser. No. 60/547,386 filed Feb. 24, 2004.

FIELD OF THE INVENTION

This invention relates to the enhancement of optical images, and more specifically to the use of apodization techniques for enhancing the resolution of optical images.

BACKGROUND OF THE INVENTION

Figure 1:
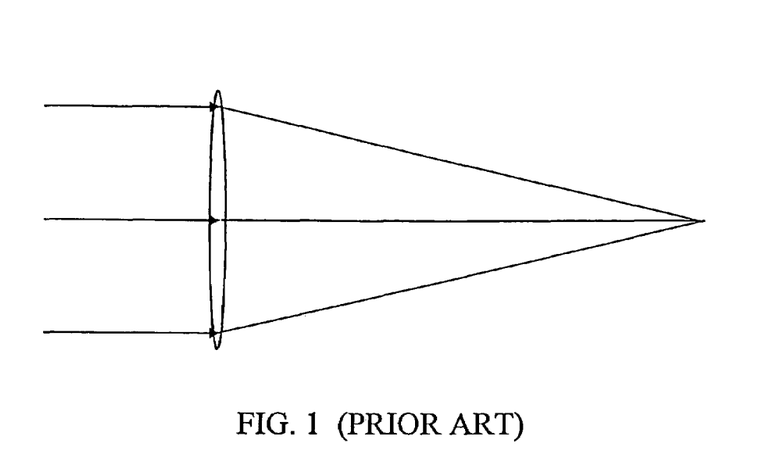
FIG. 1 shows an ideal optical telescope that focuses a point object to a point image.

The resolution of an imaging optical system determines the amount of information that can be obtained about the object being viewed. In an ideal imaging system, a point on the object is imaged to a point in the image. As an example, consider a simple telescope designed using geometrical (or ray) optics such that a point object at infinity is focused to a perfect point. See FIG. 1. Because of the wave nature of light, the light in this system will not focus to a geometrical point, but rather will focus to a small spot as shown (magnified) in FIG. 2

Figure 2:
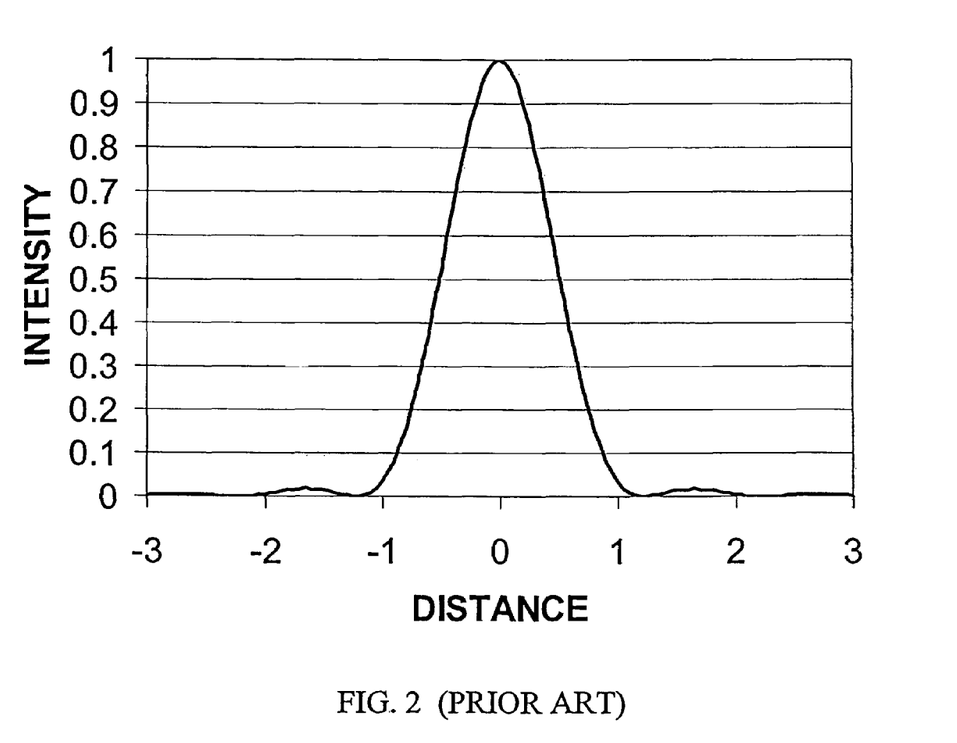
FIG. 2 shows the actual intensity profile of light focused by the telescope of FIG. 1.

In FIG. 2 most of the light is concentrated into a single lobe (centered on the location of the ideal image point) surrounded by concentric rings of decreasing intensity. This pattern, caused by diffraction, is known as the impulse response of the optical system. The width of the central lobe largely determines the resolution of the imaging system. For example, consider two point objects. Each object generates an impulse response having an intensity distribution similar to that shown in FIG. 2. As the separation between the two point objects decreases, the separation between the central lobes of the impulse responses corresponding to each point object also decreases, and the central lobes will eventually overlap at least partially. Thus, as the distance between the two point objects decreases it becomes increasingly difficult for a given imaging system to distinguish between the objects and/or determine that two point objects were present. However, two point objects having relatively narrow central lobes can be resolved at smaller separation distances by the given imaging system since the point objects must be closer together before their relatively narrow central lobes begin to overlap. Thus, the resolution of an imaging system can be increased by reducing the width of the central lobes.

Figure 3:
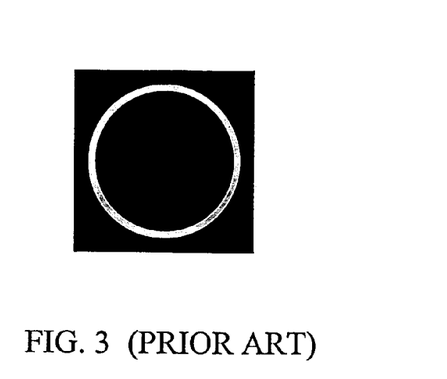
FIG. 3 shows a prior art apodization mask.

One method of reducing the width of the central lobes is a technique called apodization. Apodization consists of modifying the impulse response of the system by altering the entrance pupil of the imaging system. This can be accomplished by using a mask in which the amplitude and/or phase of the incoming beam is modified. For example, one way to narrow the central lobe of the impulse response of a telescope is to center a circular obstruction in front of or over the entrance pupil of the telescope. A central obstruction which is 90% the size of the entrance pupil of the telescope produces the annular aperture function shown in FIG. 3 and the impulse response shown in FIG. 4 (which also shows the unapodized response).

Figure 4:
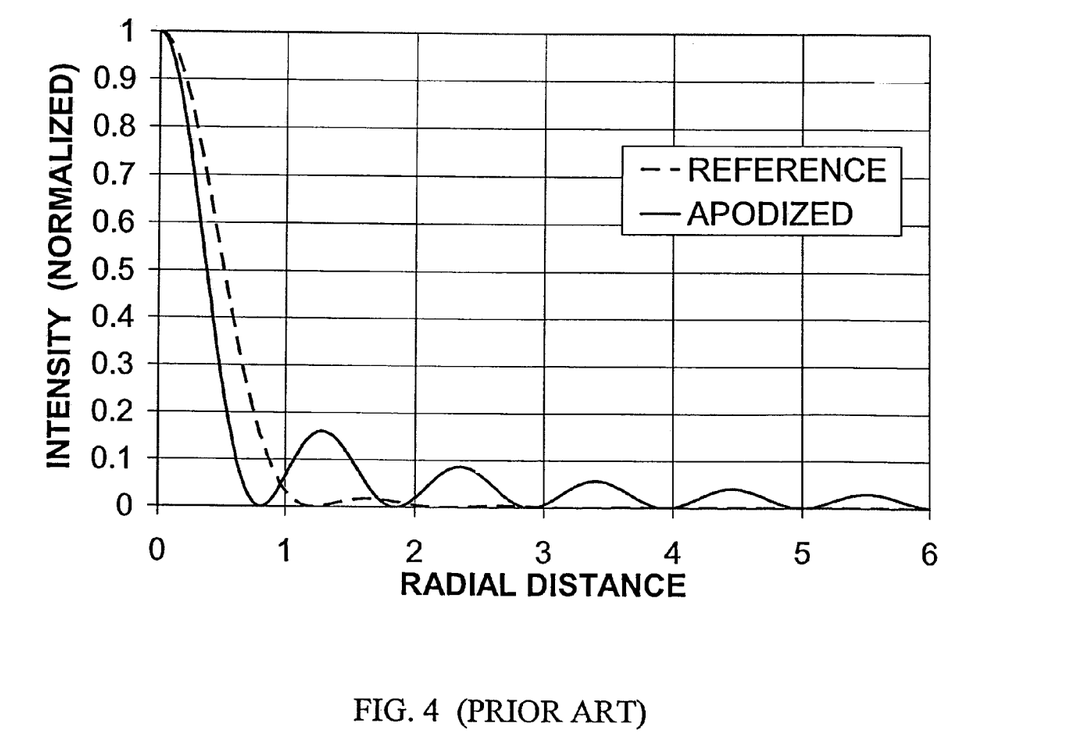
FIG. 4 shows the intensity profiles of light focused by the telescope of FIG. 1, comparing apodized and unapodized modes.

It is apparent from FIG. 4 that the impulse response of the apodized system has a much narrower central lobe. However, the magnitude of the rings or "feet" surrounding the central lobe increases and the intensity distribution of the impulse response becomes wider relative to the unapodized system. Although the resolution of point objects is enhanced with the use of the central obstruction, extended or non-point objects will appear less distinct. As an example, consider the image of a small, sharp-edged, circular disk. Each point on the object produces a corresponding point on the image having an impulse response with a corresponding intensity distribution. The resulting image is fuzzy around the edges due to the extended and increased-magnitude rings or feet of the wider intensity distribution of the impulse response.

The above analysis is an example of an apodizer that alters the amplitude of the incoming light. It has been shown (refs. [3], [5]) that the width of the central lobe can be reduced at most by a factor of 1.6 using apodizers that alter the amplitude of the light. It is also possible to produce an apodization by altering the phase of the incident light. Using such phase apodizers it has been shown (ref. [4]) that the central lobe can be indefinitely narrowed. However, this extreme is not used in practice because of an increase in intensity of the surrounding light.

Conventional apodizers use square apertures and cross-shaped apodizers, as shown in U.S. Pat. No. 5,249,080, or sawtooth patterns as shown in U.S. Pat. No. 3,977,772, or diffuse, opaque particles as shown in U.S. Pat. No. 4,030,817.

SUMMARY OF THE INVENTION

The present invention provides an apodization mask that narrows the central lobe of an optical image in a focusing system and suppresses the amplitudes of the sidelobes of that image that are within a predetermined radius of the central axis of the sidelobes, thereby enabling the system to resolve and present images of point objects that relatively close together.

DETAILED DESCRIPTION OF THE INVENTION

Conventional apodization methods either desirably narrow the central lobe while undesirably producing sidelobes of increased magnitude, or desirably reduce the sidelobes while undesirably increasing the width of the central lobe. The present invention produces an apodization that desirably narrows the central lobe and desirably reduces the magnitude of the sidelobes occurring within a certain radius of the central axis of the central lobe (or optical axis of the system).

Figure 5:
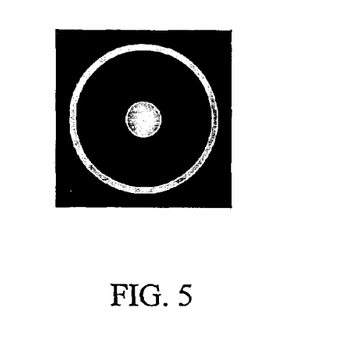
FIG. 5 shows a first embodiment of the invention's apodization mask.

In a first embodiment, the present invention includes a mask having an annular opening surrounding a small circular hole, as shown in FIG. 5, with total absorption of light by the light-obstructing parts of the mask. The invention is placed within the entrance pupil of the optical system. The mask of the present invention defines an aperture function which, in turn, defines the impulse response of the optical system.

Figure 6:
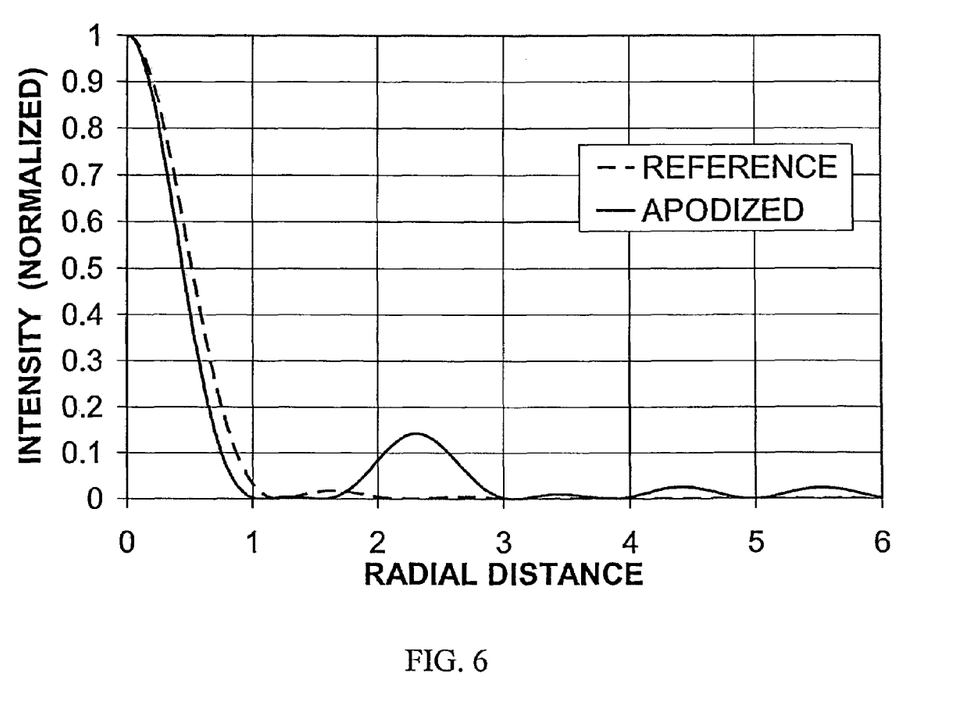
FIG. 6 shows the intensity profiles of light focused using the mask of FIG. 5, comparing apodized and unapodized modes.

The optical system with the mask of FIG. 5 produces the impulse response shown by the solid line in FIG. 6. The dashed line shows the unapodized impulse response of the same optical system. By comparison, it is apparent that the central lobe in the apodized impulse response has been narrowed and that the magnitude of the sidelobes has also been decreased out to a radius of approximately 1.8 units from the central axis of the central lobe. In addition to increasing the resolution for point objects, the use of the mask of FIG. 5 also enhances the detail visible on 'small' extended objects. The use of the term 'small' is meant to refer to instances wherein the image of the object is smaller than the distance of the dark area between the central lobe and the beginning of the sidelobe pattern. This distance is approximately 0.8 units in the above example. The reason for this enhancement of visible detail in small extended objects is due to the suppression or reduction in the amplitude of the sidelobes proximate to the central lobe. Sidelobes having a sufficient magnitude to potentially interfere with the image are far enough away from the central lobe so as to not contribute to the degradation of the image.

The invention finds application in specific cases where faint objects very near to powerful light sources must be discriminated from the light sources themselves. To be detected, the light coming from such a faint object must originate in the dark area between the central lobe and the beginning of the sidelobe pattern. The advantage of the present invention is that the diameter of the dark area around the central lobe corresponding to the light source is expanded relative to conventional apodization techniques. The present invention is therefore able to discriminate faint objects that are at a greater distance from a bright light source than can be discerned by conventional apodization systems. The invention's expansion of the dark area's diameter comes at the cost of sidelobes having a greater magnitude or intensity beyond or outside the dark area. Thus, the ability to discern faint objects outside or beyond the dark area may be obscured.

Figure 7:
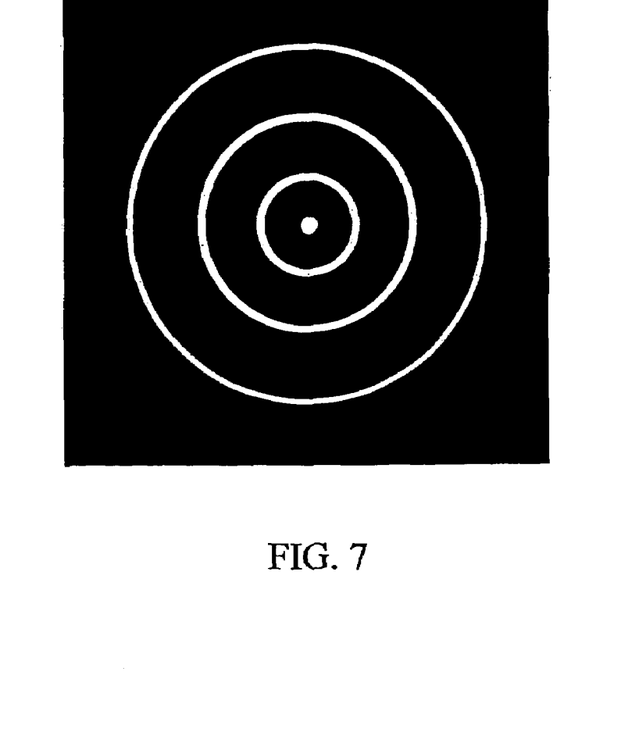
FIG. 7 shows a second embodiment of the apodization mask of the present invention.

A second embodiment of the apodizer mask of the present invention is shown in FIG. 7. This apodizer mask consists of three concentric transparent annuli and a transparent (and concentric) circular region. Exemplary dimensions of this mask are as shown in Table 1.

TABLE 1

| | Mask Dimensions | |
|---|---|---|
| | Outer radius | Inner radius |
| Outer annulus | 1.00 | 0.96 |
| Middle annulus | 0.60 | 0.56 |
| Inner annulus | 0.28 | 0.24 |
| Central circle | 0.04 | — |

Figure 8:
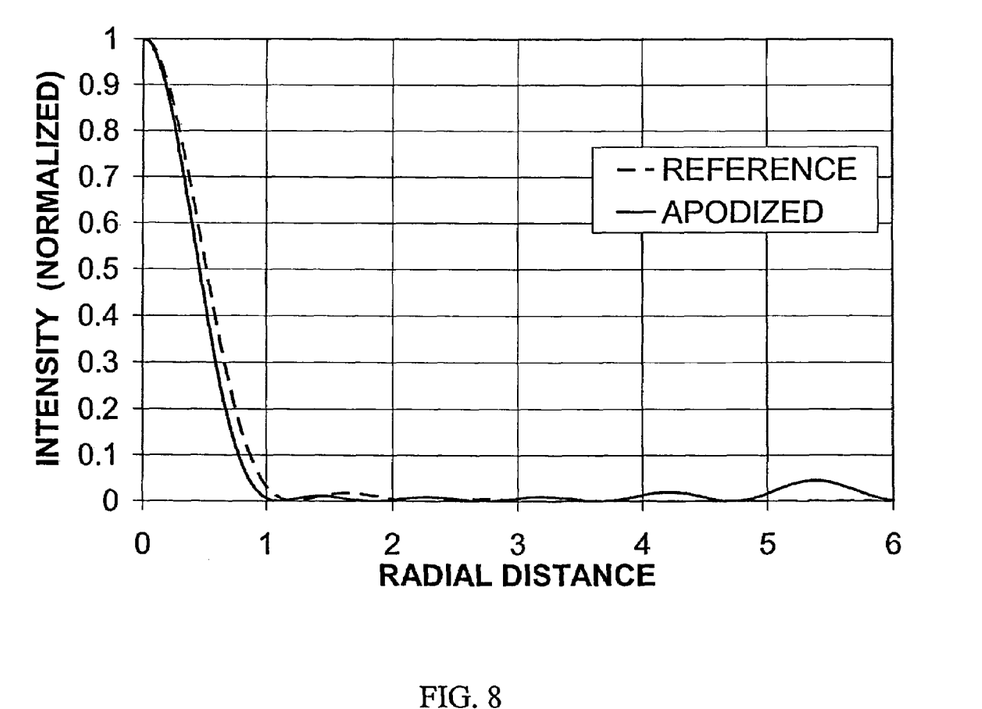
FIG. 8 shows the intensity profiles of light focused using the mask of FIG. 7, comparing apodized and unapodized modes.
Figure 9:
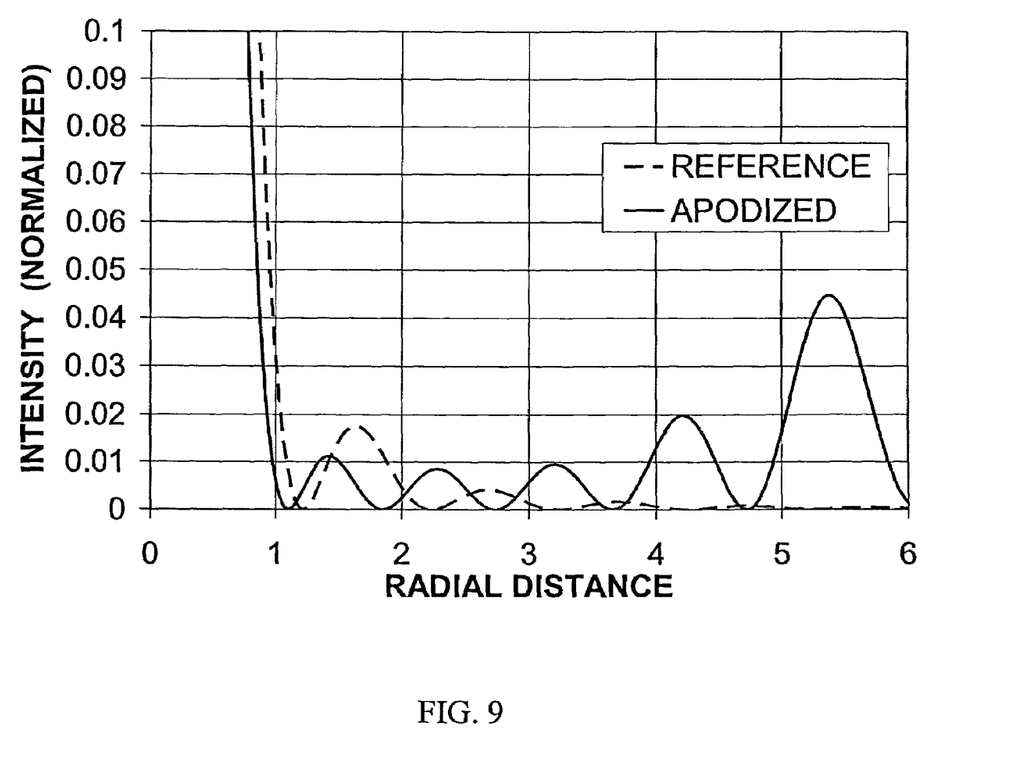
FIG. 9 shows an enlargement of the profiles of FIG. 8.

The modification this mask causes to an unappodized impulse response is shown in FIG. 8. In FIG. 9, the vertical scale of FIG. 8 is expanded in order to show the modification of the rings surrounding the central lobe. The surrounding rings in the apodized case are approximately 1% of the peak intensity out to a radius of almost 4 units. The central lobe (measured as FWHM—full width half maximum) has been reduced by about 89% relative to the reference (unapodized) case.

Figure 10:
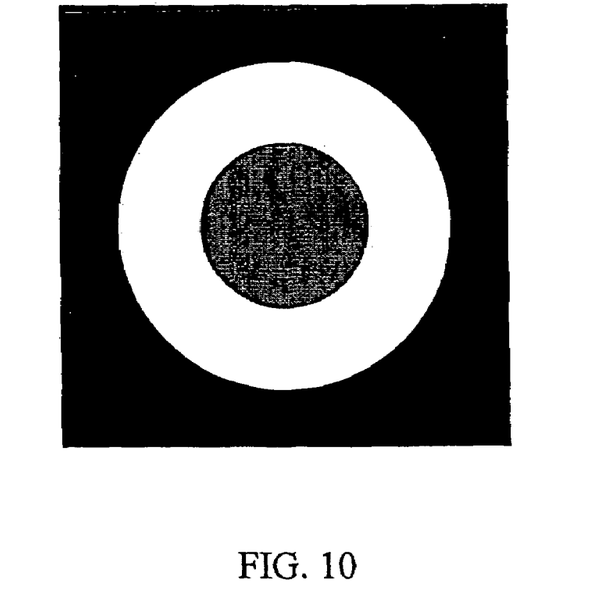
FIG. 10 shows an object to be imaged using the apodization mask of the present invention.
Figure 11:
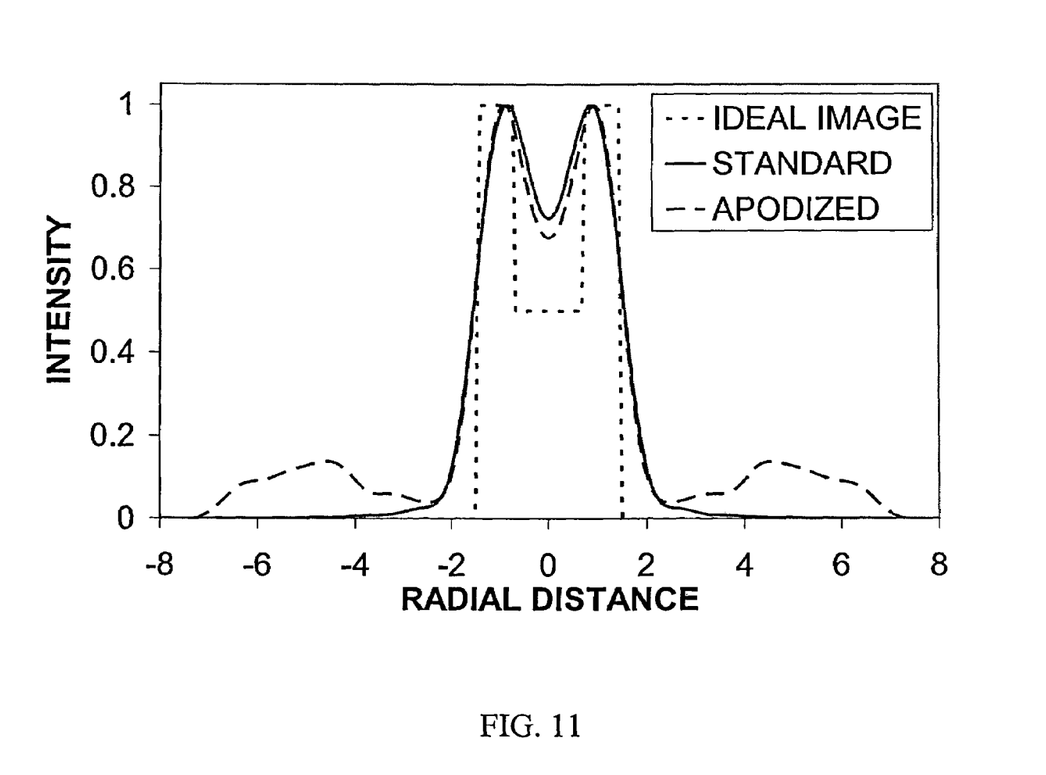
FIG. 11 shows the intensity profiles of light focused using the apodization mask of the present invention, comparing apodized and unapodized modes.

Now, consider the object shown in FIG. 10. This object consists of a bright annular region concentric with a darker circular region. The intensity of the annular region is twice that of the circular region. The diameter of the annular region is twice that of the circular region. Outside of the annular region the intensity is zero. Now consider that this object is imaged by a perfect optical system (i. e. one with an ideal, infinitely narrow, impulse response) such that the diameter of the annular region is three units. (In other words, the image in this case would appear exactly as the object with a diameter of three units.) Of course, any real optical system has a finite size to the impulse response which will degrade this ideal image. FIG. 11 shows an intensity cross-section through the center of the ideal image compared with the case of an unapodized circular aperture and the apodizer mask of FIG. 7.

Figure 12:
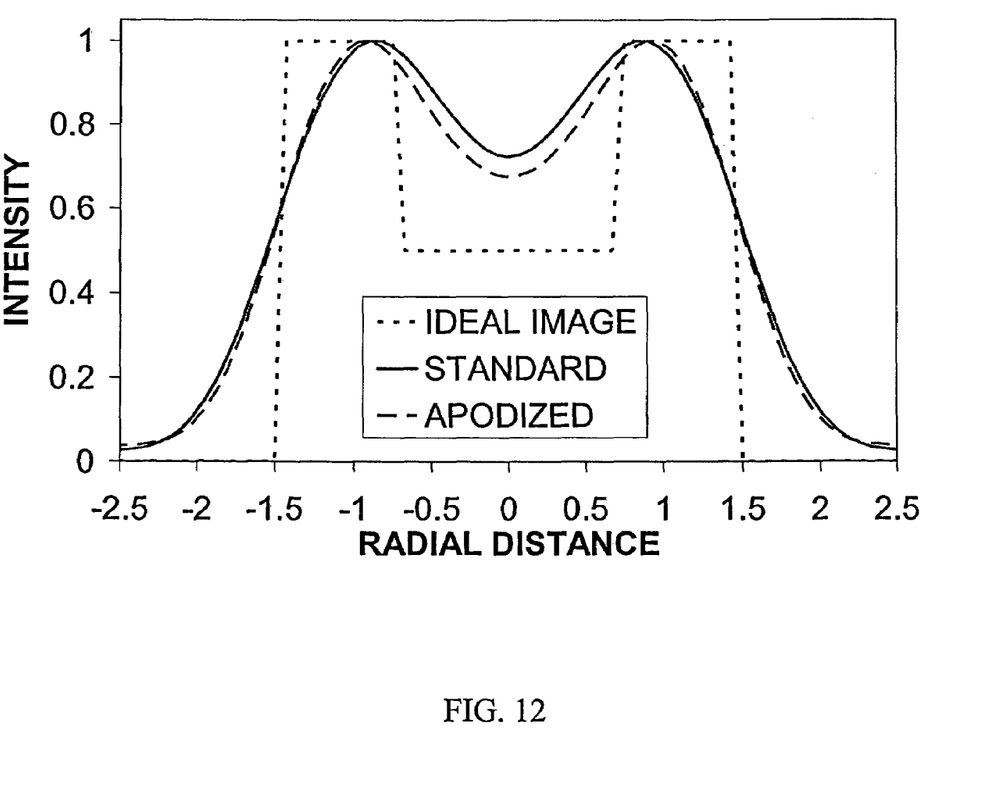
FIG. 12 shows an enlargement of the profiles of FIG. 11.

Both the unapodized and the apodized aperture generate spurious (non-zero zero magnitudes) intensities beyond the ideal edge of the image (that is, at a radial distance >1.5). The relative spurious intensity is greater in the apodized case since the surrounding rings (at a relatively large radial distance) in the impulse response are of greater intensity in order to produce a narrowed central lobe, as previously described. FIG. 12 shows the plot of FIG. 11 with an expanded horizontal scale.

Although both images show considerable 'rounding' elative to the ideal image, the apodized image more accurately represents the object. For example, the contrast between the annular and central part of the image more closely represents the contrast in the ideal image for the apodized case. In addition, the FWHM of the object better represents the size of the object in the apodized case.

It should be noted that the modified pattern/impulse response described herein is also achieved with an apodization mask that does not have a central opening. Such an apodization mask includes two or more annular regions, but no central opening.

Further, it should be noted that the modified pattern/impulse response described herein is also achieved with an apodization mask that is completely transparent, i.e., the entire area of the mask is transparent and does not include opaque or other non-light transmissive areas or features, and which alters the phase of light passing through the annular regions. Such an apodization mask includes two or more annular regions, and may or may not include a central opening.

Lastly, it should be noted that the modified pattern/impulse response described herein is achieved with an apodization mask that includes opaque and phase altering annular regions.

To summarize, the present invention provides an apodization mask and technique that improves image resolution for objects of small extended size. The method of the present invention includes modifying the impulse response of an unapodized system by simultaneously narrowing the width of the central lobe and reducing the amplitude of the surrounding sidelobes to a predetermined radial distance. Thus, the present invention increases the detail visible in the image of small objects. Although the above discussion considered the imaging of a telescope, this technique can be applied to microscopes, cameras, and other imaging devices.

REFERENCES

[1] A. J. den Dekker and A. van den Bos, "Resolution: A Survey," J. Opt. Soc. Am. A. vol. 14, no. 3, pp. 547-557, March 1997.
[2] P. Jacquinot and B. Roizen-Dossier, "Apodization, "Progress in Optics, E. Wolf, ed., (North Holland, Amsterdam) vol. 3, pp. 29-186, 1964.
[3] D. Yu Gal'Pern, Optics and Spectroscopy, vol. 9, no. 4, p. 291, 1960.
[4] J. E. Wilkins, J. Opt. Soc. Am., vol. 40, p. 222, 1950.
[5] J. E. Wilkins, J. Opt. Soc. Am., vol. 51, p. 911, 1961.
[6] J. W. Goodman, Introduction to Fourier Optics, McGraw-Hill, New York, 1968.

What is claimed is:

1. An apodization mask for improving the resolving power of an optical system, comprising:
    one or more transparent annular openings;
    a central transparent circular opening;
    wherein said mask is disposed between an object and an image plane formed by said optical system; and
    means for preventing light transmission through the mask except via the annular openings and the circular opening.

2. An apodization mask for improving the resolving power of an optical system, comprising:
    two or more transparent annular openings;
    wherein said mask is disposed between an object and an image plane formed by said optical system; and
    means for preventing light transmission through the mask except via the annular openings.

3. An apodization mask for improving the resolving power of an optical system, comprising:
    one or more transparent annular openings;
    a central transparent circular opening;
    wherein said mask is disposed between an object and an image plane formed by said optical system; and
    phase through the one or more transparent annular openings and the central transparent circular opening is altered relative to the one or more transparent annular openings of the mask.

4. A method of improving the resolving power of a telescopic system comprising:
    disposing an apodization mask between an object and an image plane formed by a telescope, wherein said mask comprises one or more transparent annular openings, a central transparent circular opening, and means for preventing light transmission through the mask except via the annular openings and the circular opening.

5. The method of claim 4 wherein said apodization mask is disposed at the entrance pupil of said telescope.

6. A method of improving the resolving power of a telescopic system comprising:
    disposing an apodization mask between an object and an image plane formed by a telescope, wherein said mask comprises two or more transparent annular openings and means for preventing light transmission through the mask except via the annular openings.

7. The method of claim 6 wherein said apodization mask is disposed at the entrance pupil of said telescope.

8. In a telescope apparatus of the type including one or more lenses, the improvement comprising:
    an apodization mask disposed at the entrance pupil of said telescope.

* * * * *